(12) United States Patent
Robinson et al.

(10) Patent No.: US 8,405,708 B2
(45) Date of Patent: Mar. 26, 2013

(54) BLUR ENHANCEMENT OF STEREOSCOPIC IMAGES

(75) Inventors: Michael G. Robinson, Boulder, CO (US); Douglas J. McKnight, Boulder, CO (US)

(73) Assignee: RealD Inc., Beverly Hills, CA (US)

(*) Notice: Subject to any disclaimer, the term of this patent is extended or adjusted under 35 U.S.C. 154(b) by 362 days.

(21) Appl. No.: 12/479,664

(22) Filed: Jun. 5, 2009

(65) Prior Publication Data

US 2010/0002073 A1 Jan. 7, 2010

Related U.S. Application Data

(60) Provisional application No. 61/059,661, filed on Jun. 6, 2008.

(51) Int. Cl.
*H04N 15/00* (2006.01)

(52) U.S. Cl. .......................... 348/42; 348/46

(58) Field of Classification Search ............ 348/42, 348/46
See application file for complete search history.

(56) References Cited

U.S. PATENT DOCUMENTS

| | | | |
|---|---|---|---|
| 6,108,005 A | 8/2000 | Starks et al. | |
| 6,426,755 B1* | 7/2002 | Deering | 345/581 |
| 7,349,006 B2* | 3/2008 | Sato et al. | 348/51 |
| 7,440,004 B2* | 10/2008 | Siegel et al. | 348/47 |
| 2003/0026474 A1 | 2/2003 | Yano | |
| 2003/0204384 A1 | 10/2003 | Owechko | |
| 2005/0063582 A1* | 3/2005 | Park et al. | 382/154 |
| 2006/0036383 A1 | 2/2006 | Clare et al. | |
| 2006/0274064 A1* | 12/2006 | Dougherty et al. | 345/422 |
| 2007/0024614 A1* | 2/2007 | Tam et al. | 345/419 |
| 2007/0177006 A1 | 8/2007 | De Zwart | |
| 2007/0248260 A1 | 10/2007 | Pockett | |
| 2009/0073170 A1* | 3/2009 | Berretty et al. | 345/427 |
| 2010/0289877 A1* | 11/2010 | Lanfranchi et al. | 348/46 |

FOREIGN PATENT DOCUMENTS

| | | |
|---|---|---|
| EP | 0 726 482 A2 | 8/1996 |
| WO | 2008155213 A1 | 12/2008 |

OTHER PUBLICATIONS

International Search Report of PCT/US2009/046499.
Boev et al.: "GPU-based algorithms for optimized visualization and crosstalk mitigation on a multiview display"; Proceedings of the SPIE—The International Society for Optical Engineering SPIE—The International Society for Optical Engineering USA; vol. 6803; pp. 1-12. XP040430994; ISSN: 0277-786X (Jan. 28, 2008).
Supplementary European Search Report for European patent application EP09759571 dated Dec. 7, 2012.

* cited by examiner

*Primary Examiner* — Larry Donaghue
(74) *Attorney, Agent, or Firm* — Baker & McKenzie LLP

(57) ABSTRACT

A method and apparatus for selectively blurring parts of an image set according to differences in disparity between successive images. As a result, the one-dimensional 'ringing' edge artifacts, intrinsic to autostereoscopic displays, are hidden, thereby improving the perceived image quality of a multi-view autostereoscopic image. The method may involve detecting regions of disparity between adjacent views, and then blurring those regions by weighted local pixel averaging. The relationship between the blur radius and the disparity is preferentially non-linear to maintain sharpness of low disparity regions.

24 Claims, 11 Drawing Sheets

BLUR ENHANCEMENT OF STEREOSCOPIC IMAGES

CROSS REFERENCE TO RELATED APPLICATIONS

This patent application relates and claims priority to provisional patent application 61/059,661, entitled "Blur Enhancement of Stereoscopic Images," filed Jun. 6, 2008, which is herein incorporated by reference for all purposes.

BACKGROUND

1. Technical Field

The disclosed embodiments relate generally to stereoscopic imagery and, more specifically, to enhancement of stereoscopic images by blurring image disparity.

2. Background

Conventional displays are two-dimensional (2D) in that images are contained within the plane of the display. The sensation of depth is a consequence of cues that are familiar to the visual system such as perspective, size variations, obscuration, et cetera. Three-dimensional (3D) visualization, as advertised by gaming consoles, is brought about by enhancing these cues, but rarely creates correct depth sensation. Such depth sensation may be achieved with careful use of stereopsis, whereby different images are seen by the left and right eye. The geometry of image-capture by two physically separate eyes provides depth information because objects are imaged with different relative positions on each eye's retina. These differences are called "disparity" and are the natural consequence of observing objects at different distances, or depth, from the observer. Surprisingly, this type of stimulation can be so strong that any relative shift of images in left and right eyes can lead to perceived depth. For example, people who have magnification differences between eyes, perhaps by nature or medical procedure, can often sense 3D effects in 2D photographs. This strong association between disparity and depth can also lead to people unknowingly accepting incorrect pseudoscopic imagery (those that have left and right eye stereoscopic images swapped) until obvious fatigue sets in. Because of the tendency of the visual system to identify and try to use disparity, poor quality 3D has often been presented with predictable initial enthusiasm followed by disappointment. The current resurgence in stereo 3D is, in part, a consequence of good quality content displayed using state-of-the-art stereoscopic display technology.

Apart from the inherent benefits of good quality 3D display, another part of the shift towards this technology concerns the saturation of 2D display development. Existing trends toward bigger, brighter and more colorful HDTVs is exceeding consumer demand in the dominant home market. Stereoscopic 3D has already started to reestablish itself in theaters with the recent release of several feature length films, while stereo gaming is also becoming more established with the release of 3D enabled TVs based on DLP projection technology. A common feature of these display systems is the need to wear specific eyewear, passive in the movie theatre environment and active or shutter glasses for game applications. Eyewear-based systems are the first to be commercially accepted as they offer a technologically convenient method of discriminating between the left and right eyes of multiple viewers. Ultimately, it would be desirable for eyewear-free, or autostereo, systems to deliver sufficiently high quality 3D.

SUMMARY

Generally, a method is described that improves the perceived quality of a multi-view autostereoscopic display by blurring parts of the image set depending on the differences in disparity between successive images. As a result, the one-dimensional 'ringing' edge artifacts, intrinsic to autostereoscopic displays, are hidden. The method may involve detecting regions of disparity between adjacent views, and then blurring those regions by weighted local pixel averaging. The relationship between the blur radius and the disparity is preferentially non-linear to maintain sharpness of low disparity regions.

According to an aspect, a method for enhancing a stereoscopic image is disclosed. The method includes determining differences in disparity between adjacent image views in an image set. The image views include at least two different perspective views of the stereoscopic image. The method further includes blurring at least one portion of at least one of the image views in the image set.

According to another aspect, a method for enhancing a stereoscopic image is disclosed that includes inputting image views in an image set. The image views including at least two perspective views of the stereoscopic image. The method further includes blurring at least one portion of at least one of the image views in the image set; and outputting the modified image views of the image set.

According to yet another aspect, a system for enhancing a stereoscopic image is disclosed. The system includes a disparity determining module operable to determine differences in disparity between adjacent image views in an image set, the image views comprising at least two different perspective views of the stereoscopic image. The system further includes a blurring module operable to blur at least one portion of at least one of the image views in the image set.

According to yet another aspect, a system for enhancing a stereoscopic image includes an input module operable to receive image views in an image set. The image views include at least two perspective views of the stereoscopic image. The system also includes a disparity deriving module operable to derive disparity data based on the differences in disparity between adjacent image views in the image set. The system further includes a replacing pixels module operable to replace the pixel values of a second view of the adjacent image views with the average of the local pixel values when a first view of the adjacent image views is the last view in the image set. The replacing pixels module is also operable to replace the pixel values of the last view in the image set and the pixel values of the next to last view in the image set with the average of the local pixel values when a first view of the adjacent image views is not the last view in the image set. The system also includes an output module operable to output the modified image views of the image set.

Other features and variations are disclosed herein.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
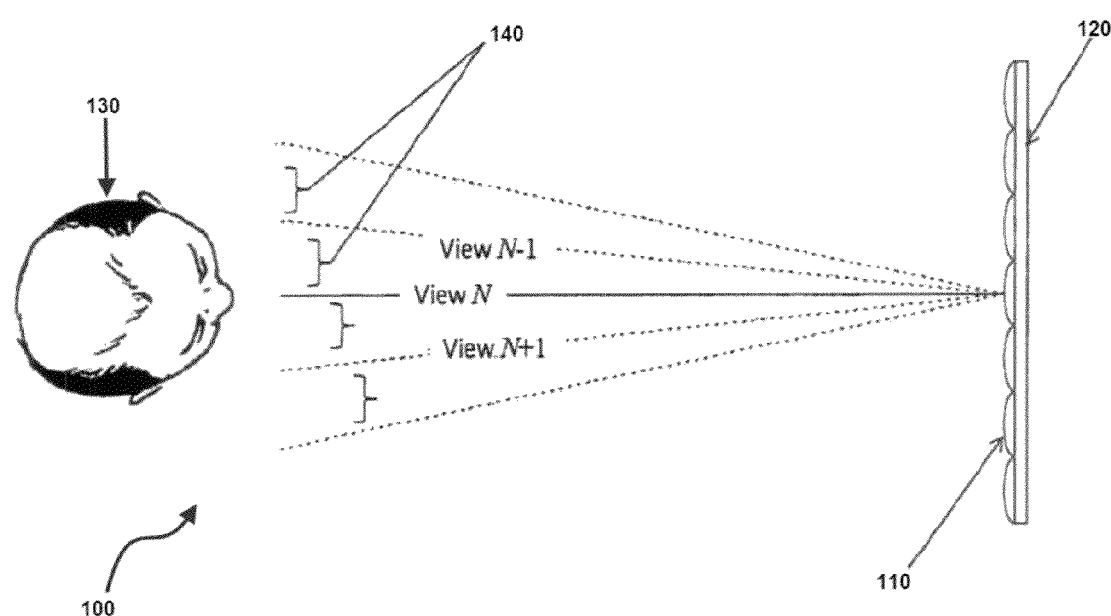
FIG. 1 is a schematic diagram of an exemplary autostereoscopic system as viewed from above, in accordance with the present disclosure.

FIG. 1 is a schematic diagram of an exemplary autostereoscopic system as viewed from above. Autostereoscopic system 100 includes micro-optical lens array 110 in front of 2D display 120. The micro-optical lens array 110 acts to limit, or select, the subset of pixel elements seen at any one viewing angle. As illustrated by "View N," "View N−1," and "View N+1," a viewer 130 may perceive more than one view from each micro-optical array 110, with a region 140 between the views, in which the adjacent views are mixed. Different images may be seen depending on the viewer 130 position.

Figure 2:
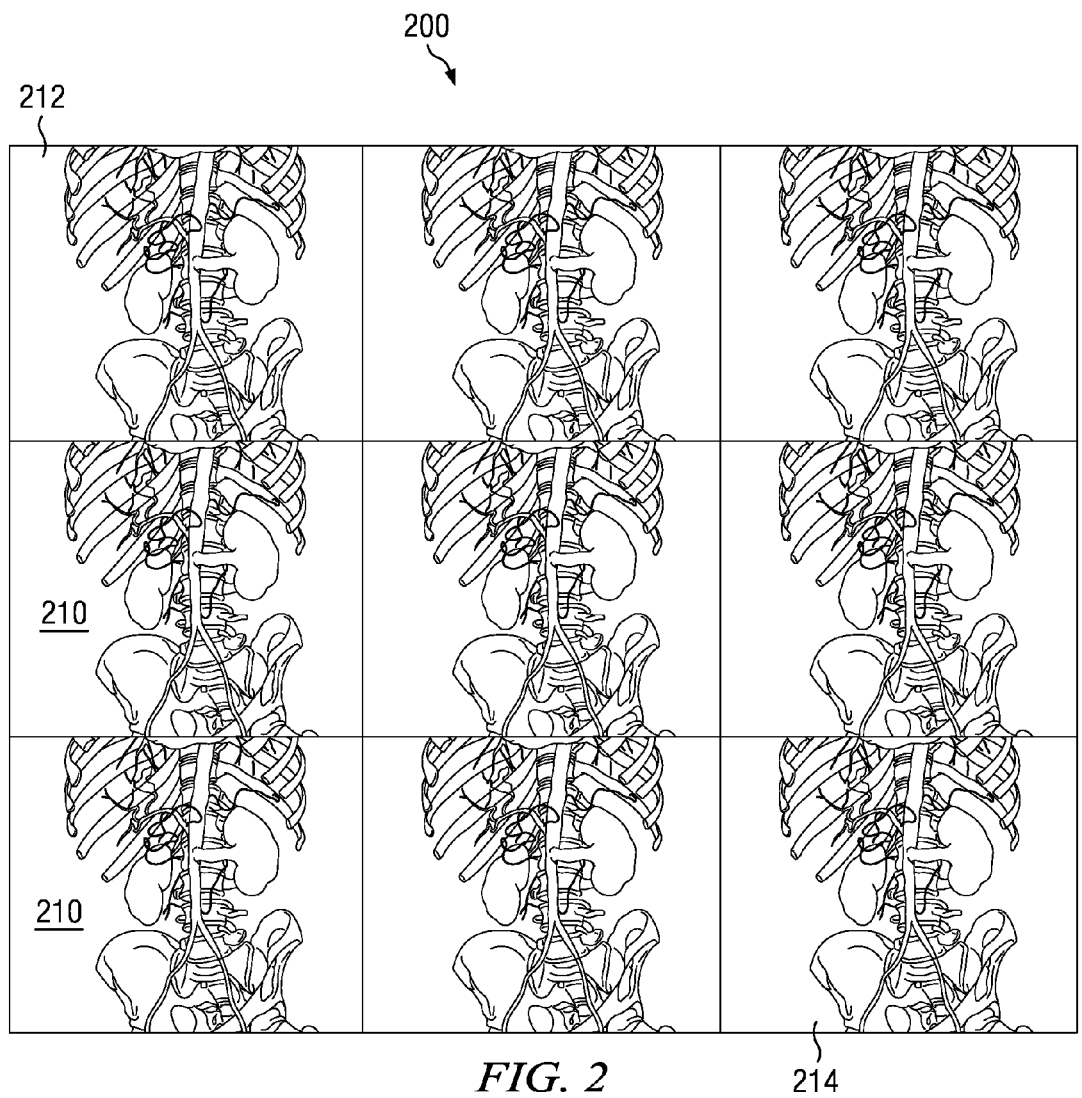
FIG. 2 is a schematic diagram of a nine-view data-set used in typical autostereoscopic systems, in accordance with the present disclosure.

FIG. 2 is a schematic diagram of a nine-view data-set used in typical autostereoscopic systems. The diagram illustrates a composite image 200 including individual views 210 typical of image views used in an autostereoscopic display. The nine-view data-set of different images 210 may be seen depending on a viewer's position. The nine tile format of the view set 200 images has left- to right-side views stacked in a 'raster' format with the top-left view 212 being the extreme left view, and bottom right view 214 the extreme right view. The resolutions of each image view 210 is ⅑ of the total pixels for the display. For an autostereoscopic display, nine is a convenient number for various reasons and is typical, but other numbered views may be used.

Due to the nature of the system shown in FIG. 1, a viewer 130 will usually observe a mixture of adjacent images, which vary in regions of greatest disparity or depth. For regions in the plane of the display 120, there is substantially no disparity and the imaging remains sharp irrespective of viewing angle.

Referring back to FIG. 1, since a viewer's 130 eyes subtend different viewing angles to any given display 120, the autostereoscopic system 100 can be engineered such that different images can be seen in left and right eyes. Furthermore, as the viewer moves around the display, additional independent views are seen giving the correct, and important, 'motion parallax' sensation of a natural 3D scene. This is an improvement upon eyewear-based stereo systems that only provide one image to any one eye irrespective of the eye's position or viewing angle. The image in this latter case is perceived to pivot about the plane of the screen in an unnatural manner.

In principle, an autostereo solution is better. However, a drawback with conventional autostereo systems is that each view demands many pixels and, to get a realistic high-quality display, there should be many perspective views. Such displays use a large total viewing angle. For example, a TV in the corner of a room may have a 90° (or π/2 radians) viewing angle filled with separate views, each containing a set of pixels that make up an independent image. Furthermore, to get a stereo effect, there should be at least two views within the angle subtended by the eyes; otherwise little distinction between right- and left-eye images is achieved. Finally, since it is desired to transition nearly seamlessly between adjacent images to avoid obvious abrupt transitions, as a function of angle, these images would preferably be very similar, reducing effective disparity and leading to "flat" images. To have large disparity between left and right eyes while minimizing differences between adjacent images, many views (say Ne≈10) are used within the eyes' subtended angle ($\theta e$ ≈0.05 rad). A TV with a 900 viewing angle would therefore use a high number of views, each with a relatively high number of pixels (1300×800≈1M)—approximately $$\frac{\pi Ne}{2\theta e}$$

million views or ≈300,000,000 pixels. This is about one hundred times more than are currently displayed on a state-of-the-art HDTV.

Current autostereo systems utilizing realistic numbers of pixel elements compromise, i.e. typically, viewing zones are reduced from the desired 90° to more realistic viewing angles such as 10° (a factor of nine less than desired) with the micro-optical array replicating the views. Additionally, the number of pixels per view is reduced to 640×480 or VGA-like (a further factor of four reduction), leaving the number of views between eye positions between three and four. To achieve reasonable disparity in this compromised case, a visible transition between views as a function of angle in the far background and foreground of the image results. Since instantaneous transitions between views are avoided by design, mixed images of adjacent views are typically seen. The superposition of images in regions away from the plane of the display leads to 'ringing' or double edging. Such 'ringing' or double edging is undesirable because it makes the image look as if it is juddering, making it very noticeable to an observer. Furthermore, it may provide a limitation to the depth perception by the observer.

Figures 3, 3A:
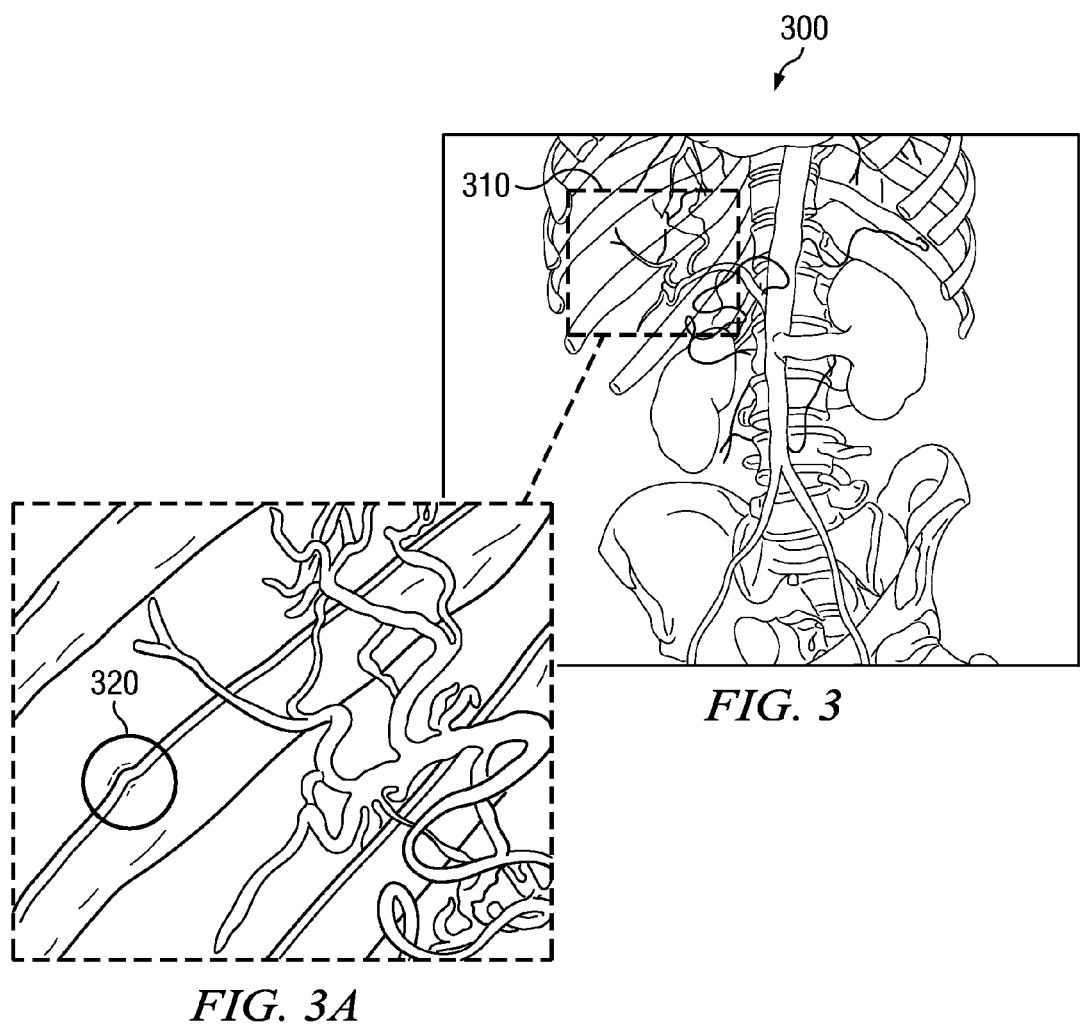
FIG. 3 is a schematic diagram of an exemplary mixed view from an autostereo display, in accordance with the present disclosure.
FIG. 3A illustrates a magnified view of a portion of FIG. 3.

FIG. 3 is a schematic diagram 300 of an exemplary mixed view from an autostereo display and FIG. 3A illustrates a magnified view of a region 310 of FIG. 3. Portion 320 within magnified region 310 illustrates 'ringing' or double edging from the super position of images. The 'ringing' artifact is particularly perceptible in cases of sharp vertical edges or in areas of high contrast texture. It is often associated with familiar 'depth of focus' effects by the viewer, but, in general, appears unnatural.

With respect to the depth of focus, in standard 2-D photographs, the properties of the optical system, such as the focal length of the lens and the lens aperture, lead to a progressive increase in image blur for objects that are progressively further away from the plane that is in focus on the camera's film or detector. This effect is sometimes used creatively to direct the viewer's attention to the object of interest. For example, portrait photographers sometimes use a moderately long focal length combined with a large aperture to throw the background out of focus. People are used to seeing effects like this, and find it quite natural. The double-edging or ringing effect in autostereo displays is, however, not as natural and these artifacts detract from the detailed quality of the imagery.

This disclosure introduces two-dimensional blurring in regions of large disparity to provide a more natural 'depth of focus' effect, which disguises the 'ringing' artifact. The automatic approach first identifies where large disparity occurs and second, blurs local pixel values in accordance with the nearest neighbor disparity. In an embodiment, the approach is more effective when blurring is substantially avoided until the disparity reaches a specific value.

A technique is described that improves the perceived quality of a multi-view autostereoscopic display by blurring parts of the image set depending on the differences in disparity between successive images. As a result, the one-dimensional 'ringing' edge artifacts, intrinsic to autostereoscopic displays, are hidden. The technique involves detecting regions of disparity between adjacent views, and then blurring those regions by (optionally weighted) local pixel averaging. The relationship between the blur radius and the disparity is preferentially non-linear through use of a threshold to maintain sharpness of low disparity regions.

Process Overview

An embodiment of this approach is provided below by way of example only, and does not limit the disclosure to any specific disparity/depth mapping, filtering of the derived disparity map, non-linear disparity-dependent blurring relation, or any other specific embodiment.

Figure 4:
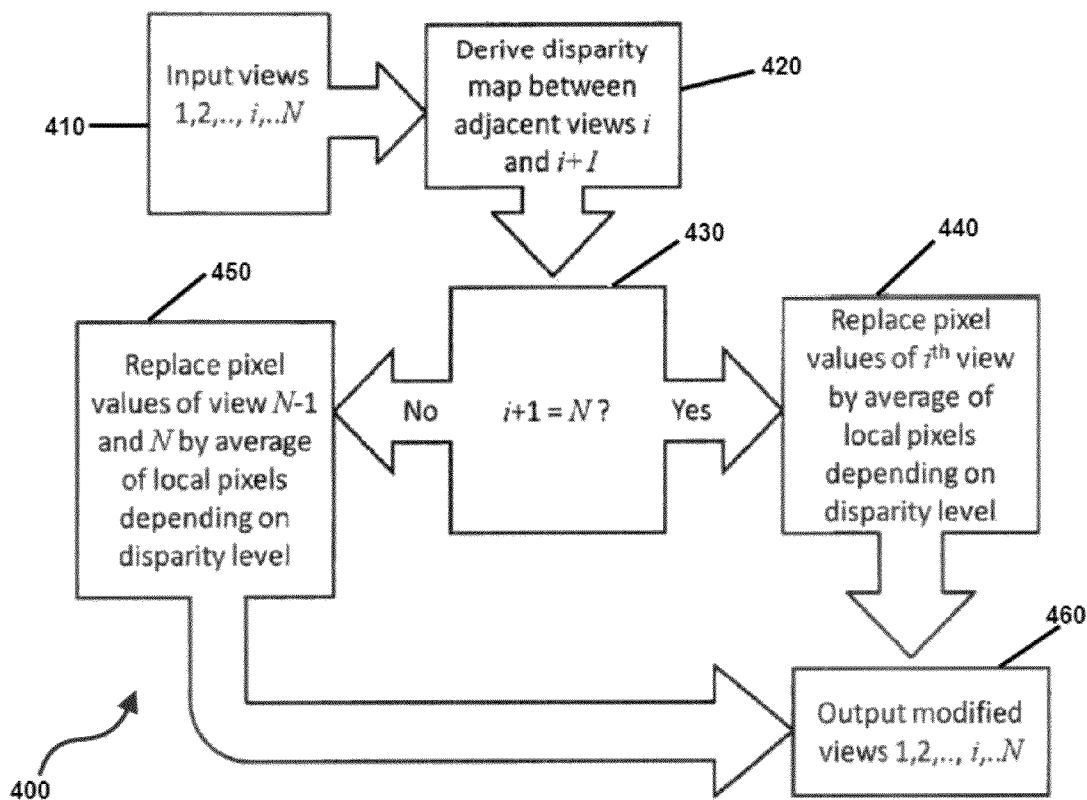
FIG. 4 is a flow diagram illustrating a blurring process, in accordance with the present disclosure.

FIG. 4 is a flow diagram 400 illustrating an embodiment of a general approach to enhancing stereoscopic imagery by blurring image disparity. The first step 410 is to input the views of the image, or the image data. Once the image data are entered, the next step 420 is to derive the disparity map between the adjacent views in the image data. For example, compare image view A (e.g., left image; view N) with view B (e.g., right image; view N+1) to derive a disparity map. If view B is the last view in the image data (step 430), then the next step is to replace the pixel values of view A by averaging the local pixels 440, depending on the disparity level. More specifically, a new value for each pixel, $p_{i,j}$ in image A may be found by calculating the average value of the pixels close to $p_{i,j}$, with the definition of "close" depending on the disparity level. For example, each color value of $p_{i,j}$ could be replaced with $(p_{i-1,j-1}+p_{i,j-1}+p_{i+1,j-1}++p_{i-1,j}+p_{i,j}+p_{i+1,j}+p_{i-1,j+1}+p_{i,j+1}+p_{i+1,j+1})/9$, where the choice to average over the nine nearest neighbor pixels is determined by the magnitude of the disparity at pixel, $p_{i,j}$. In this example, we are averaging over a square region ranging over +/−1 pixels in both x and y directions. It can be said, therefore, that a "blur parameter" of one has been used. The blur parameter is calculated from the disparity level (which can be measured in pixels) in a way chosen to create the desired "strength" of blurring effect. This is discussed more later. If view B is not the last view in the image data (step 430), then the next step is to replace the pixel values of the last and next-to-last views by averaging the local pixels 450, depending on the disparity level. Once the pixels are replaced, the final step is to output the modified views 460.

Input Views

As previously stated, the image data may be input by reading into a computer the set of image files, representing the multiple views to be displayed, in a conventional format such as JPEG, GIF, et cetera.

Derive Disparity Map

Disparity may be estimated using methods based on movement estimation of pixel blocks.

Figure 5:
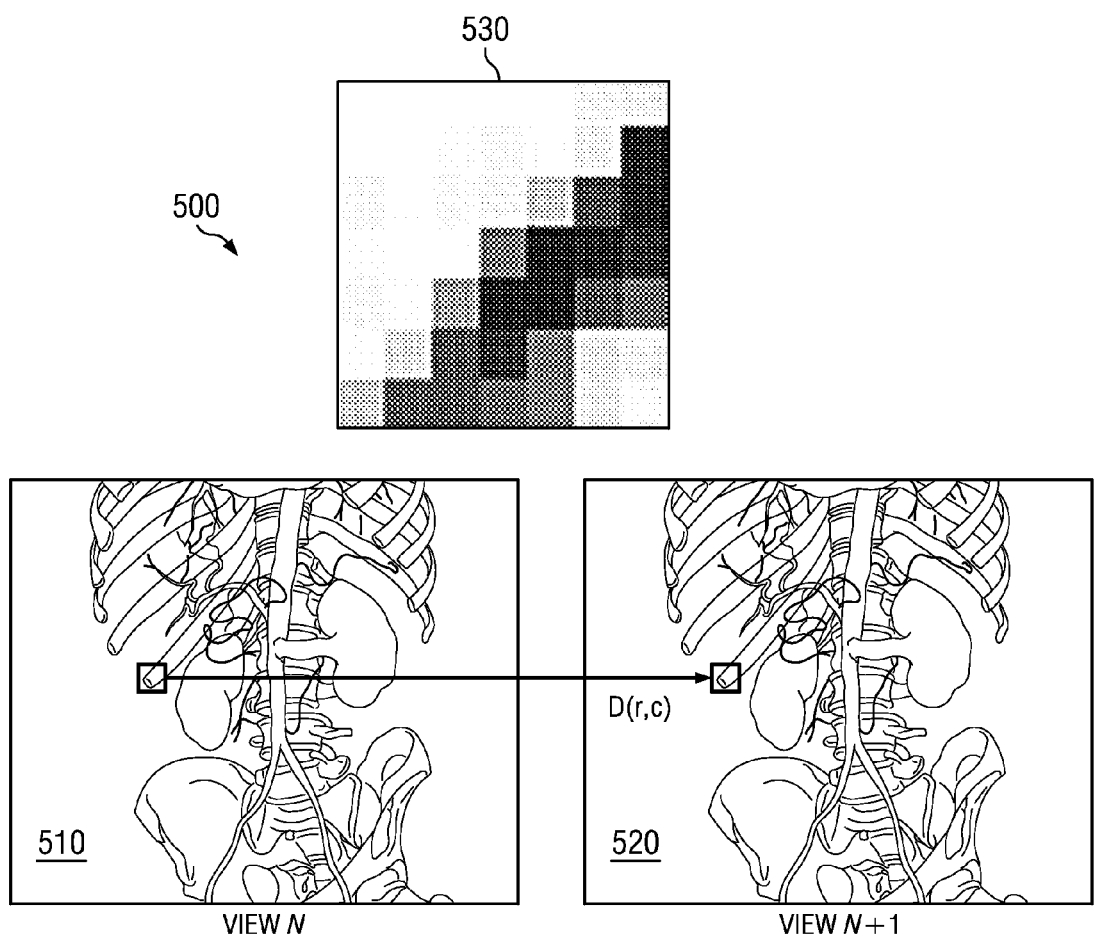
FIG. 5 is a schematic diagram illustrating how disparity within an exemplary multi-view image set is determined using block-based motion estimation, in accordance with the present disclosure.

FIG. 5 is a schematic diagram 500 illustrating how disparity within an exemplary multi-view image set is determined using block-based motion estimation. Adjacent images 510, 520 selected from the exemplary embodiment image set in FIG. 2 are shown. A test block 530 is used to determine local shifts or disparity between views by local matching. A pixel block size, such as 6 by 6, is chosen. A good choice of block size is large enough so that features will be identified from background noise but not so large as to take too much time computationally. In any case, the block should preferably be much smaller than the image size. Then the blocks are taken in series from one image, and each shifted predominantly (but not necessarily exclusively) in the horizontal direction by a certain amount, be it positive, zero or negative. For each shifted position, the pixel blocks are compared with an equivalently sized block in the adjacent image. A best match is found when the difference between pixel blocks is minimal. A suitable metric to determine differences is the sum of the squared differences between pixel luminance values, or:

$$\text{Diff}=\Sigma_{pixel\ block}(\text{Pixel\_intensity}(\text{View }N)-\text{Pixel\_intensity}(\text{View }N+1))^2.$$

The shift that corresponds to the minimum difference is designated the disparity for that block. This "block-matching" approach is applied all over the image, with the goal of generating a "disparity-map," which is simply an array of numbers that describes the estimated shift of features from one image to its neighbor image.

For example, for a nine-view autostereoscopic image of a person, who has an outstretched hand in the foreground, and a tree in the distance behind them, it is likely that the images would be processed such that the main subject—the person's face—would be in the plane of the display and would have little, or no, shift from image-to-image in the multiple view representation. The estimation of the disparity made between views N and N+1 is made by taking a block of pixels from image N and then, computationally, shifting it and looking for the best comparison with the pixels in image N+1 (this process can be compared to sliding transparencies over each other and looking for the best match). The block of pixels representing, for example, part of the subject's eye could be best matched in the other image by a block of pixels in exactly the same location. This means the disparity at this point in the image is zero. A block of pixels representing part of a branch in the distant tree might best match with a block of pixels shifted to the right by 2 pixels in image N+1. The disparity at this point in the image is said to be +2. Similarly, a block of pixels representing part of the fingernail of the outstretched hand could best be matched by a block of pixels shifted left by 3 pixels in image N+1. The disparity at this point of the image is −3.

Figure 6:
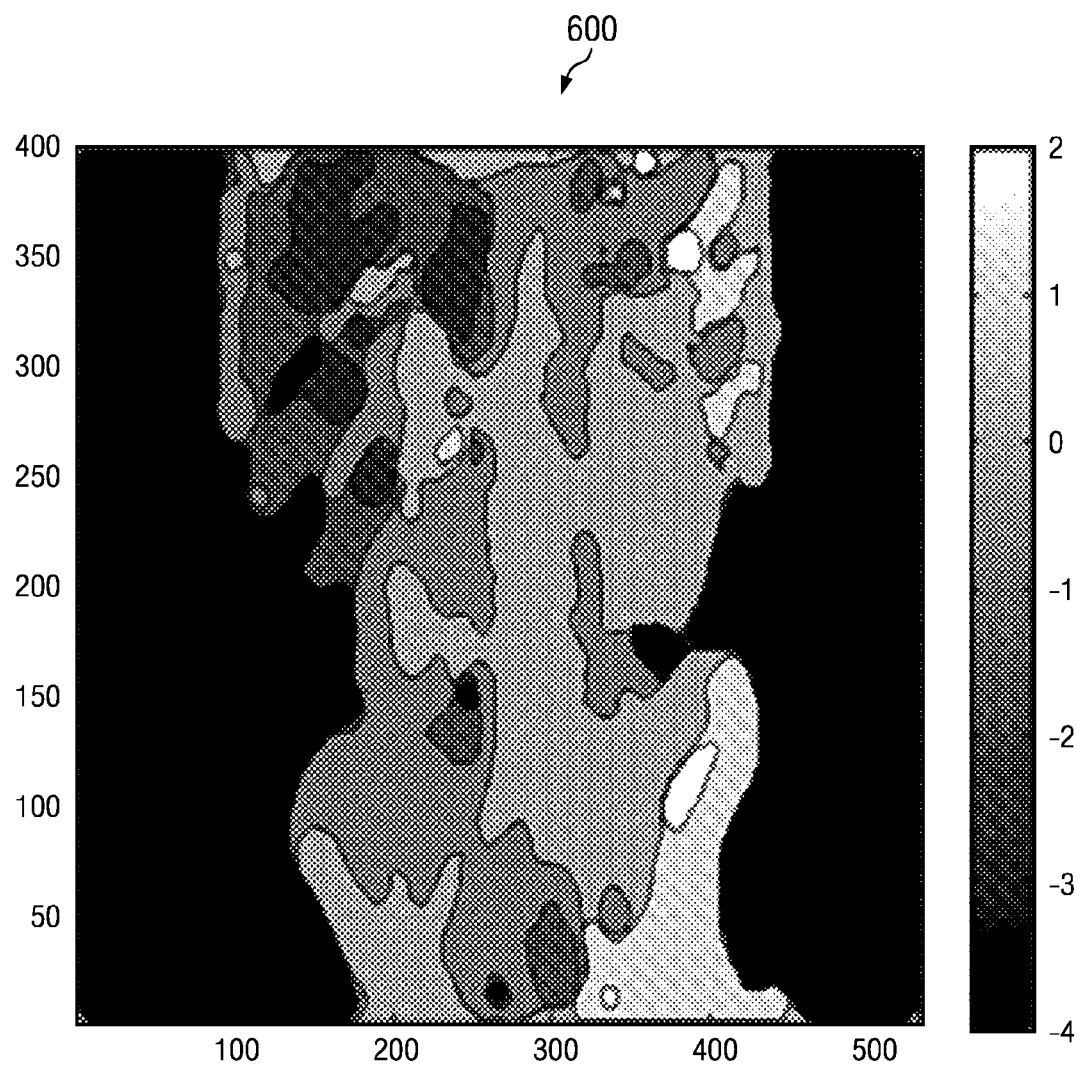
FIG. 6 is a schematic diagram illustrating spatially filtered disparity, in a disparity map, in accordance with the present disclosure.

FIG. 6 is a schematic diagram illustrating spatially filtered disparity in a disparity map 600. In an embodiment, a disparity map 600 can be "smoothed" by conventional filtering means to give a smoothly varying disparity map as illustrated. Smoothing with standard techniques such as median filtering removes spurious small details in the disparity map that are likely related to noise in the images.

Image Blurring

Once a disparity map is obtained, the images corresponding to the adjacent views in question can be blurred as a function of this disparity. For small blur regions (e.g., 3×3 pixels) it is sufficient to average over a square area, as described above, but for much larger regions it may be preferable to blur by averaging over an approximately circular area, or even to use Gaussian blurring. The exact relationship between the area over which pixels are averaged and the disparity value can be altered with the goal of hiding vertical line, or "ringing" artifacts. In an embodiment, it is preferred that blurring is not performed unless necessary since it can degrade the sharpness of low disparity areas that may not present a noticeable ring. In an embodiment, a thresholded linear relationship between blur and disparity may be used to determine if blurring should be implemented. In the terms of the earlier example:

blur=abs(disparity−1).

In this case, the blur is zero until the disparity is greater than a threshold of 1, and above this threshold blur increases linearly with disparity.

In another embodiment, the user may choose to only blur areas with disparity greater than two pixels. In this embodiment, a non-linear threshold relationship is used in which, for a disparity level of three and above, the pixels may be averaged over a blur pixel grid where blur=$(2n+1)^2$ and where n=$Disparity^2$.

Figure 7:
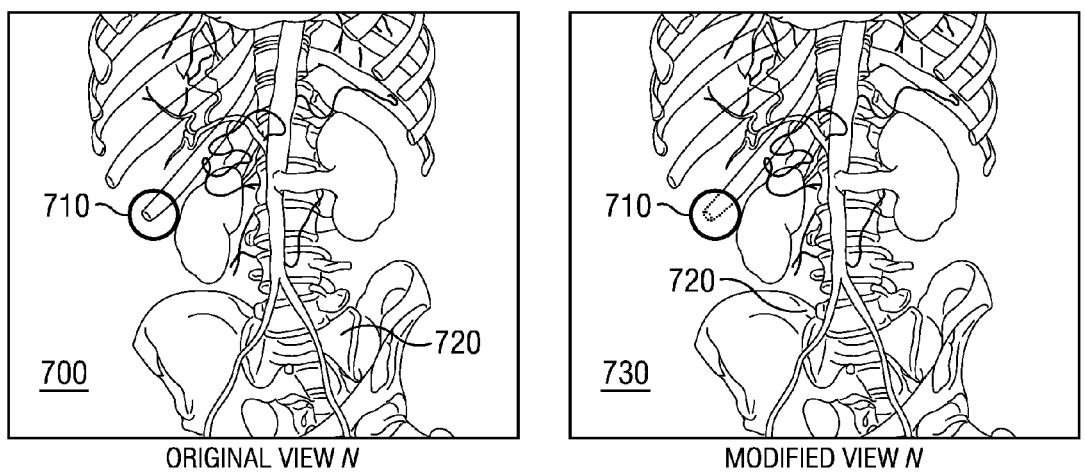
FIG. 7 is a schematic diagram illustrating the disparity-related blurring effect on one view of the example image set, in accordance with the present disclosure.

FIG. 7 is a schematic diagram illustrating the disparity-related blurring effect on one view of the example image set. The original, unaltered image 700 is compared to its modified version 730 to illustrate the effects of the non-linear disparity-related blurring. In areas with large disparity between adjacent images 710, the modified view image appears blurred. The regions with minimal disparity 720 typically remain unaltered because the resulting degradation of the final image would be more detracting than the original disparity between the images.

Figures 8, 8A:
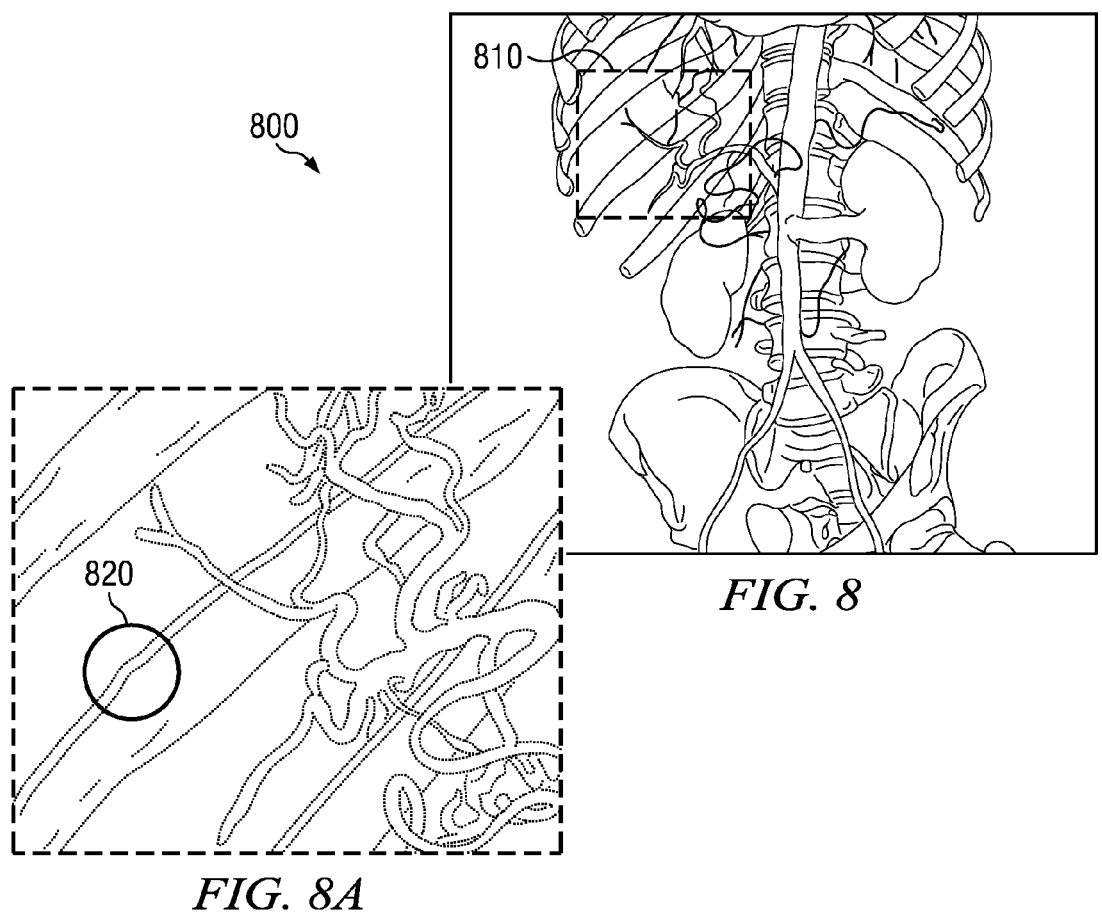
FIG. 8 is a schematic diagram illustrating the modified images seen on the display when mixing is present, in accordance with the present disclosure.
FIG. 8A illustrates a magnified view of a portion of FIG. 8.

FIG. 8 is a schematic diagram 800 illustrating the modified images of FIG. 7, seen on a display when mixing is present. FIG. 8A illustrates a magnified view of a region 810 of FIG. 8, which shows the blurred mixed image of FIG. 7, wherein the ringing artifact 820 is now disguised by blurring.

Figure 9:
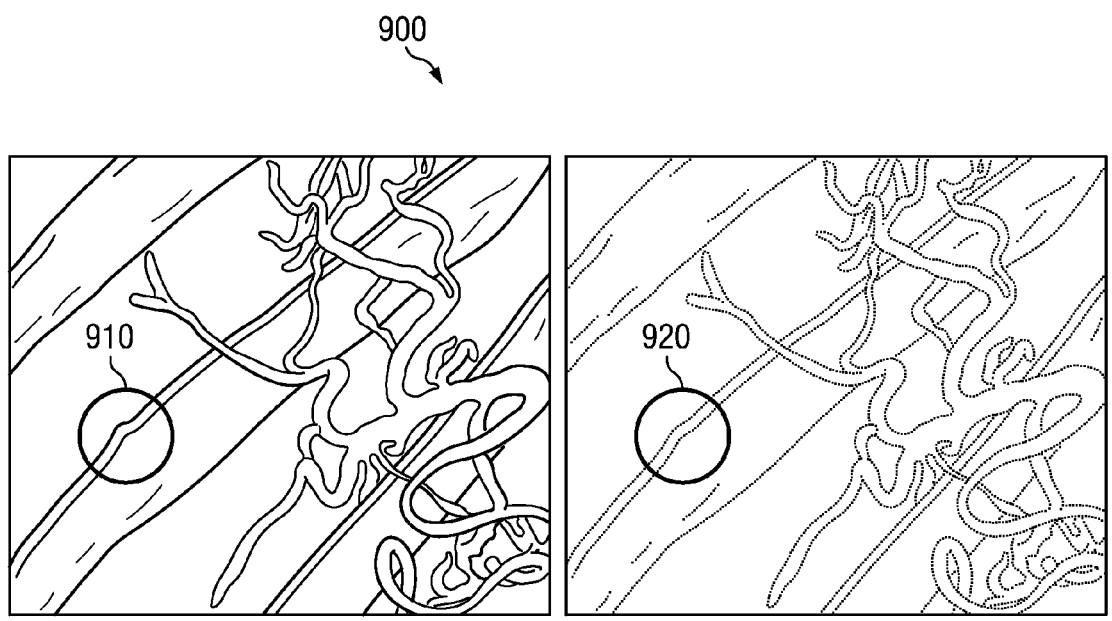
FIG. 9 is a schematic diagram illustrating a comparison of an exemplary image before and after blurring, in accordance with the present disclosure.

FIG. 9 is a drawing 900 illustrating a comparison between the detailed images of FIGS. 3 and 8, in which the original view 910 is the detailed image of FIG. 3, and the modified view 920 is the detailed image of FIG. 8. Upon comparison of the two images, an improvement is noticeable in the ringing at the expense of more natural 'depth of field' blurring.

In an exemplary embodiment, the blurring is applied vertically as well as horizontally, even though the ringing artifact is a function of horizontal disparity. The circularly symmetrical nature of the blurring contributes to its natural appearance because it is similar to the blurring introduced by photographers in 2-D photography.

Output Modified Views

A next step of the process is to output the modified views. The modified views can be output as a series of image files for later use, or they can be used directly for input to a system such as described by Lipton et al in U.S. patent application Ser. No. 10/956,987, which is herein incorporated by reference, that describes a system that converts multiple input views into the specific processed pixel data required by a lenticular autostereoscopic display.

Figure 10:
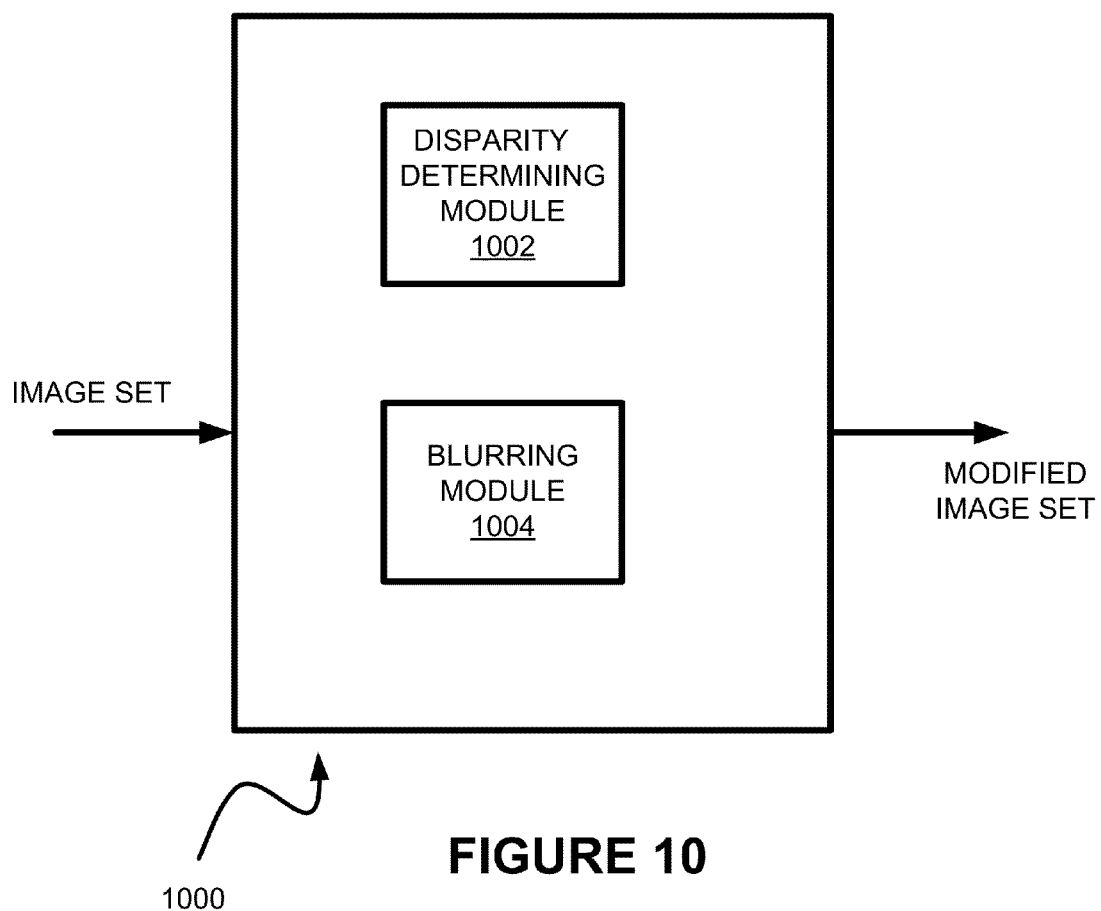
FIG. 10 is a schematic diagram illustrating a system 1000 for enhancing a stereoscopic image, in accordance with the present disclosure.

FIG. 10 is a schematic diagram illustrating a system 1000 for enhancing a stereoscopic image. The system 1000 includes a disparity determining module 1002 and a blurring module 1004. Disparity determining module 1002 is operable to determine differences in disparity between adjacent image views in an image set. In disparity determining module 1002, the image views include at least two different perspective views of the stereoscopic image. Blurring module 1004 is operable to blur at least one portion of at least one of the image views in the image set. In an embodiment, the blurring module 1004 may be operable to blur using weighted local pixel averaging.

Figure 11:
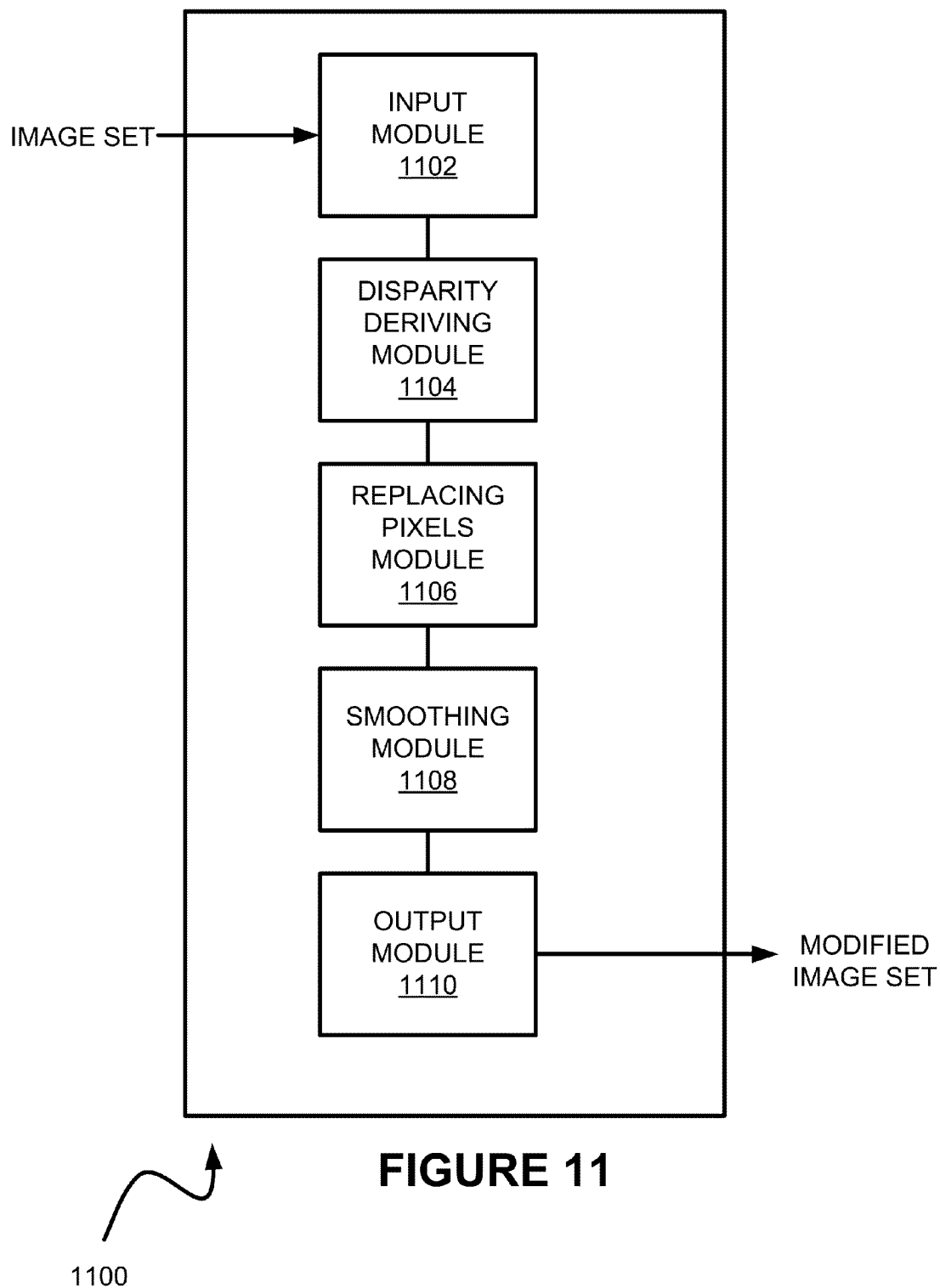
FIG. 11 is a schematic diagram of a system 1100 for enhancing a stereoscopic image, in accordance with the present disclosure.

FIG. 11 is a schematic diagram of a system 1100 for enhancing a stereoscopic image. The system 1100 includes an input module 1102, disparity deriving module 1104, replacing pixels module 1106, and an output module 1110. The system 1100 may optionally include a smoothing module 1108.

In operation, input module 1102 is operable to receive input image views in an image set, the image views including at least two perspective views of the stereoscopic image. Disparity deriving module 1104 is operable to derive disparity data based on the differences in disparity between adjacent image views in the image set. A replacing pixels module 1106 is operable to replace the pixel values of a second view of the adjacent image views with the average of the local pixel values when a first view of the adjacent image views is the last view in the image set, and is operable to replace the pixel values of the last view in the image set and the pixel values of the next to last view in the image set with the average of the local pixel values when a first view of the adjacent image views is not the last view in the image set. In an embodiment, optionally, a smoothing module 1108 may be included that is operable to smooth the disparity map with median filtering. An output module 1110 is operable to output the modified image views of the image set.

In an embodiment, the disparity deriving module 1104 is operable to use a block-based motion estimation. In another embodiment, the disparity deriving module 1104 is operable to generate a disparity map comprising an array of numbers describing an estimated shift of features between adjacent image views.

The systems and the techniques of the present disclosure as described herein may be implemented using software running on a computer processor, or they may alternatively be implemented in hardware, in logic circuitry, or a combination thereof. A personal computer, workstation, server, or a standalone processor may be utilized to conduct the processing described herein.

While various embodiments in accordance with the principles disclosed herein have been described above, it should be understood that they have been presented by way of example only, and not limitation. Thus, the breadth and scope of the invention(s) should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. A method for enhancing a stereoscopic image, the method comprising:
    determining differences in disparity between adjacent image views in an image set, the image views comprising at least two different perspective views of the stereoscopic image; and
    blurring at least one portion of at least one of the image views in the image set if one of the differences in disparity exceeds a predetermined value.

2. The method of claim 1, wherein the blurring at least one portion of at least one of the image views in the image set comprises blurring by local pixel averaging.

3. The method of claim 2, wherein the blurring by local pixel averaging comprises weighted local pixel averaging.

4. The method of claim 1, wherein the blurring at least one portion of at least one of the image views in the image set comprises two dimensional blurring.

5. The method of claim 1, wherein the blurring at least one portion of at least one of the image views in the image set comprises blurring multiple portions of a plurality of the image views in the image set.

6. A method for enhancing a stereoscopic image, the method comprising:
    inputting image views in an image set, the image views comprising at least two perspective views of the stereoscopic image;
    blurring at least one portion of at least one of the image views in the image set; and
    outputting the modified image views of the image set.

7. The method of claim 6, wherein the blurring at least one portion of at least one of the image views in the image sets comprises: deriving disparity data based on the differences in disparity between adjacent image views in the image set; when a first view of the adjacent image views is the last view in the image set, replacing the pixel values of a second view of the adjacent image views with the average of the local pixel values; and when a first view of the adjacent image views is not the last view in the image set, replacing the pixel values of the last view in the image set and the pixel values of the next to last view in the image set with the average of the local pixel values.

8. The method of claim 7, wherein the deriving disparity data based on the differences in disparity between adjacent image views in the image set comprises using a block-based motion estimation.

9. The method of claim 7, wherein the deriving disparity data based on the differences in disparity between adjacent image views in the image set comprises generating a disparity map, the disparity map comprising an array of numbers describing an estimated shift of features between adjacent image views.

10. The method of claim 9, further comprising smoothing the disparity map by filtering.

11. The method of claim 10, wherein the smoothing the disparity map by filtering comprises using median filtering.

12. The method of claim 10, further comprising blurring the adjacent image views as a function of the disparity data.

13. The method of claim 12, wherein the blurring the adjacent image views comprises averaging pixels over a square area of the adjacent image views.

14. The method of claim 12, wherein the blurring the adjacent image views comprises averaging pixels over a substantially circular area of the adjacent image views.

15. The method of claim 12, wherein the blurring the adjacent image views comprises using Gaussian blurring.

16. The method of claim 12, wherein the blurring the adjacent image views further comprises: blurring only the portions of the image adjacent image views for which the disparity data exceeds a predetermined threshold.

17. A system for enhancing a stereoscopic image, the system including:
    a disparity determining module operable to determine differences in disparity between adjacent image views in an image set, the image views comprising at least two different perspective views of the stereoscopic image; and
    a blurring module operable to blur at least one portion of at least one of the image views in the image set if one of the differences in disparity exceeds a predetermined value.

18. The system of claim 17, wherein the blurring module is operable to blur using weighted local pixel averaging.

19. The system of claim 17, wherein the stereoscopic image is for an autostereoscopic system.

20. A system for enhancing a stereoscopic image, the system comprising:
    an input module operable to receive image views in an image set, the image views comprising at least two perspective views of the stereoscopic image;
    a disparity deriving module operable to derive disparity data based on the differences in disparity between adjacent image views in the image set;
    a replacing pixels module operable to replace the pixel values of a second view of the adjacent image views with the average of the local pixel values when a first view of the adjacent image views is the last view in the image set, and operable to replace the pixel values of the last view in the image set and the pixel values of the next to last view in the image set with the average of the local pixel values when a first view of the adjacent image views is not the last view in the image set; and
    an output module operable to output the modified image views of the image set.

21. The system of claim 20, wherein the disparity deriving module is operable to use a block-based motion estimation.

22. The system of claim 20, wherein the disparity deriving module is operable to generate a disparity map comprising an array of numbers describing an estimated shift of features between adjacent image views.

23. The system of claim 22, further comprising a smoothing module operable to smooth the disparity map with median filtering.

24. A system for enhancing a stereoscopic image, the system comprising:
    an input module operable to receive an image set comprising image views, the image views comprising at least two perspective views of the stereoscopic image;
    a disparity deriving module operable to derive disparity data based on the differences in disparity between adjacent image views in the received image set;
    a blurring module operable to blur at least one portion of at least one of the image views in the received image set; and
    an output module operable to output the modified image views.

* * * * *